United States Patent [19]

Wittkopf et al.

[11] Patent Number: 4,519,757

[45] Date of Patent: May 28, 1985

[54] WEB SURFACE TREATING APPARATUS

[75] Inventors: Eugene W. Wittkopf, Suamico; Allen R. Jorgensen, Abrams; Robert A. Daane, Green Bay, all of Wis.

[73] Assignee: Magna-Graphics Corporation, Oconto Falls, Wis.

[21] Appl. No.: 571,596

[22] Filed: Jan. 17, 1984

[51] Int. Cl.³ .................. B29D 7/14; B29C 15/00
[52] U.S. Cl. .................. 425/143; 425/194; 425/363; 425/367
[58] Field of Search ........... 425/143, 144, 194, 363, 425/367

[56] References Cited

U.S. PATENT DOCUMENTS

| | | | |
|---|---|---|---|
| 3,016,819 | 1/1962 | Kupka | 425/367 X |
| 3,339,228 | 9/1967 | Seanor et al. | 425/143 X |
| 3,346,913 | 10/1967 | Lake et al. | 425/194 |
| 3,386,130 | 6/1968 | Grunewald et al. | 425/367 X |
| 3,562,043 | 2/1971 | Eddy | 425/363 X |
| 3,785,279 | 1/1974 | Fails | 425/143 X |
| 3,820,933 | 6/1974 | Aspin | 425/367 |
| 3,960,475 | 6/1976 | DeLigt et al. | 425/143 X |
| 4,117,054 | 9/1978 | Salo | 425/367 X |
| 4,124,349 | 11/1978 | Lehmann | 425/367 |
| 4,171,942 | 10/1979 | Missenard | 425/367 |
| 4,233,011 | 11/1980 | Balender et al. | 425/363 X |
| 4,408,974 | 10/1983 | Comerio | 425/194 |

Primary Examiner—J. Howard Flint, Jr.
Attorney, Agent, or Firm—Andrus, Sceales, Starke & Sawall

[57] ABSTRACT

A five roll calendar apparatus includes five rolls mounted in a common horizontal plane, including three heated rolls with first and second covered rolls. Each heated roll includes an inner rigid core having an outer finished surface. A plurality of grooves are formed by machining the face of the core and a thin sleeve is shrunk fit onto the core to seal the grooves and establish heat transfer passageways. The size of the passageways, the separating lands and the shell thickness are such that the temperature at the surface of the roll is essentially constant over the portions of the cavity and the adjacent core body. The thin outer wall establishes a short time response for correcting the temperature of the web. The center roll is rotatably fixed and the other rolls are individually loaded toward the fixed roll for controlling of nip pressure. The covered rolls are mounted in suitable slide supports. The end rolls are mounted to a torque shaft which provides a high degree of squareness to the roll loading. A roll squeezes surface air from the web. Grooved guide rolls maintain proper web flatness. Heat sensing units are located to monitor web surface temperature and each is connected in a closed loop control for a heated roll.

23 Claims, 8 Drawing Figures

WEB SURFACE TREATING APPARATUS

BACKGROUND OF THE PRESENT INVENTION

This invention relates to a web surface treating apparatus and particularly to apparatus for calendaring the surface of webs such as magnetic tape webs used for manufacture of magnetic storage disks, carbonless coated paper webs and the like.

In the manufacture of relatively thin film products, the base material may be advantageously provided in large rolls of appropriate web material. The product is then made from the web material through suitable automated machinery. In various applications the surface of the web material should be finely finished to provide the proper end product. A typical example is finishing of a magnetic film which is subsequently used as a source for manufacture of magnetic floppy disks and the like. Carbonless coated paper web is another example where calendaring is desirable to form a compact skin which is firmly affixed to the base. Various devices to calendar the surface have been manufactured and are commercially available. Although a horizontally arranged unit is available, the units generally have been made of a series of vertically stacked rolls including two intermediate fabric covered rolls located between three alternating steel rolls. The steel rolls are normally chrome or stainless surfaced and provided with highly finished mirror finish. The web is fed from a suitable sources and threaded through the rolls. In appropriate polishing and finishing of the web, the pressure applied to the web and the temperature of the web are relatively critical factors which must be appropriately controlled and maintained. The steel rolls include controllable heat means for controlling the temperature of the rolls and thereby the temperature of the web. As the web passes through the nip of the rolls, the working of the material may result in significant changes in the temperature. This requires appropriate changes in the temperature of the rolls.

Generally, the prior art has used various forms of heating including electrical heating cartridges and flow of a heated liquid through passageways in the steel roll and the like to control the temperature of the web. In addition, the rolls are appropriately positioned through pneumatic or hydraulic loading to control the nip pressure.

Although the various systems have been suggested and are available, the control of the pressure and temperature continues as a problem with respect to optimum results and life. In vertically oriented systems, it is quite difficult to control the pressure systems. In the prior art heating controls, the response time has been quite long, on the order of 5 to 10 minutes. Because of the long response period, it is extremely difficult to maintain the web at the proper temperature.

Thus, there remains a need for a calendaring apparatus and other roll type apparatus having means for accurate and rapid change in the temperature of the roll as well as appropriate, convenient processing of the web with control of the nip pressure.

SUMMARY OF THE PRESENT INVENTION

The present invention is particularly directed to a web surface treating roll apparatus which has been particularly applied to calendar a magnetic polyester film suitable for forming of magnetic disks, tapes and the like and the present invention is particularly described in connection with such application for simplicity and clarity of explanation. The invention may, however, be equally aplicable to treating the surface of any web material.

Generally, in accordance with the teaching of the present invention, the web or film processing apparatus includes at least one heated roll in combination with means for monitoring the temperature of the web and controlling the temperature of the roll to maintain the web at a desired temperature.

In accordance with one aspect of the present invention, a rigid heat transfer roll is specially constructed with a plurality of parallel heat transfer passageways circumferentially distributed about the roll and spaced inwardly from the peripheral heat transfer surface by a relatively thin wall. The spacing between the passageways and the thickness of the heat transfer wall are constructed and arranged to establish and maintain an essentially constant temperature at the surface while maintaining a rigid outer peripheral surface in the presence of a working pressure at the surface of the machine. Thus, the size of the passageways and the thickness of the outer wall are related such that under operating conditions, the outer wall does not deflect into the passageway cavity. Correspondingly, however, the size of the cavity, the separating lands and the wall thickness are such that the temperature at the surface of the roll is essentially constant over the portions of the cavity and the adjacent core body. The thin outer wall establishes a short time response for correcting the temperature of the web or other member travelling over the roll while maintaining precise location and working of the web surface. In addition as a practical matter, the size of the passages are of course selected and designed to permit operating with practical pressure levels and flow rates.

In a particularly practical construction, the rigid roll includes an inner core having an outer finished surface. The passageways include a plurality of grooves formed by machining in the face of the core. A sleeve is affixed over the core to seal the grooves and thereby divide the passageways. As the application is applied in a heated environment, heating of the core can serve to expand the core and affect an appropriate fit with the outer cover or shell thereby establishing a strong but responsive integrated roll.

In a preferred embodiment, the roll includes an inner solid core, the outer face of which is provided with a plurality of longitudinally extending grooves separated by substantial core lands. A thin shell is shrunk fit onto the core so as to create an interference fit and thereby provide an effectively integral connection of the shell to the core. The shrink fit places the shell in tension and establishes a proper outer closure which permits high pressure flow of liquid through the passageways. The thin shell rapidly responds to any change in temperature of the rapid flowing liquid. The special roll structure thus establishes essentially optimum heat transfer from the cavity to the core and the shell and thereby to the web as well as providing appropriate support for the shell.

An apparatus to calendar a magnetic film surface includes at least a pair of heated rolls to the opposite side of a resilient roll such as a fiber, a plastic or other suitably covered roll. The web is threaded over the one end roll and back over the covered roll and then over the opposite steel roll. The inventors have found that with the appropriate construction of the grooved core and shell, very high rate flow of high temperature liquid can be provided within the grooves providing very short time response for controlling the temperature of the roll and thereby the temperature of the web. The inventors have found that as applied to a calendaring apparatus, adjustment of the web temperature is created in time periods on the order of 10 to 15 seconds for normal corrections in contrast to the multiple minutes required with prior art type systems.

In a practical application, the web temperature is monitored immediately as it exits from the nip of the rolls by a suitable non-contact heat sensing means. The temperature provides an appropriate signal for changing the temperature to the upstream heated roll of the sensed position for providing appropriate maintenance of the temperature of the web. Thus, the sensed temperature provides a signal for modifying the temperature of the roll creating any change in temperature of the web.

Each of the heated rolls is provided with a completely separate and independent closed loop heating system and control connected to sensor units. The heating system includes an independent liquid heating unit for heating of a liquid such as oil, a water-antifreeze mixture, a brine or the like. The heated liquid is pumped to and through the corresponding steel roll for corresponding transfer of heat to the web passing therebetween.

In accordance with the concept of the present invention, each of the heated rolls is constructed to provide a rapid response to sensed demand change. Each set of rolls also establishes a reference level for controlling the next set of downstream rolls. This provides a means for effective control of the temperature of the web and therefore the final finish of the web.

More particularly, in one preferred and practical embodiment of the invention, a five roll calender apparatus includes five rolls mounted as a horizontal machine with the five rolls mounted with their axes in a common horizontal plane. The system could obviously have been constructed as a single three roll unit or expanded to a seven roll unit. The five roll calendar apparatus includes three heated steel rolls mounted in horizontally spaced relation with a pair of fabric covered rolls disposed between the steel rolls. The center roll is mounted in rotatably fixed relation to the other rolls. All other rolls are individually hydraulically loaded toward the fixed roll for controlling of the nip pressure applied to the web. Each of the steel rolls is also formed with a heated liquid flow-through design, while the fabric covered rolls are condition fixed; i.e., without temperature control. In operation, the unit is operated without web during a run-in cycle of an appropriate period to bring the heated rolls and the system to a start condition. The steel and fabric rolls to each side of the center steel roll are provided with its own hydraulic loading control system such that the apparatus may be operated as either a five roll calendar or a three roll calendar.

The end rolls are similarly mounted on a pivot bracket connected to a torque shaft which provides a high degree of squareness to the roll loading. A suitable hydraulic motor unit such as a cylinder/piston unit is coupled to the pivot bracket for pivotal orientation of the roll. The two covered rolls are mounted in suitable slide, pivot or other suitable supports for movement along, or substantially along, the horizontal plane of the apparatus. The infeed roll to the five roll calendar includes a rubber coated roll for guiding and locating of the web. Grooved guide rolls provided for maintaining proper web flatness so the web moves into the nip of the downstream rolls. The guide rolls are positioned so that the web does not contact the same spot or element of the covered roll when at the back or opposite side of the covered roll at the same point to prevent the same covered roll element from twice calendaring the web.

A web-heat sensing unit is located immediately downstream of the nip of each steel roll and is oriented to monitor the surface temperature of the web passing from between the rolls.

The web is withdrawn from an unwind stand and passed through a web coupling unit into the calendar apparatus from the lower end of the one end steel roll. The web passes over the first heated steel roll and between the nip of that heated roll and the adjacent covered roll. The web passes downwardly beneath the center or fixed heated steel roll and then backwardly and upwardly between the center roll and the covered roll. The web passes over the center roll and then vertically downwardly to an idler roll, to one of alternate paths, one for the three roll calendar arrangement and the second for the five roll calendar arrangement. In the five roll calendar arrangement, the web is fed upwardly between the second covered roll and the end heated roll, around such heated roll and downwardly to a chill unit and a final takeup or rewind assembly. Non-contacting sensor units are mounted to respectively monitor the temperature of the web leaving each of the heated steel rolls.

A suitable web cleaner for cleaning the web surface prior to calendaring is located between the unwind stand and the calendar rolls. A chill roll unit receives the calendared web and cools the web prior to rewinding thereof. The chill roll unit is preferably provided with a closed loop temperature control.

The inventors have found that the invention with the controlled pressure and temperature for each set of rolls provides for optimum working of the surface such as calendaring a magnetic tape polyester film and the like to provide the required fine finish.

DESCRIPTION OF THE DRAWING FIGURES

The accompanying drawings illustrate the best mode presently contemplated by the inventor for carrying out the invention.

In the drawings:

FIG. 4 is a separate view of a heated roll with parts broken away and sectioned to show detail of construction;

FIG. 5 is an enlarged end view of the roll shown in FIG. 4;

FIG. 6 is an enlarged fragmentary longitudinal section of the roll shown in FIGS. 4 and 5;

FIG. 7 is an enlarged fragmentary transverse section of the roll shown in FIGS. 4 and 5; and FIG. 8 is an enlarged fragmentary transverse section taken on line 8—8 of FIG. 1 and illustrating a slide support of a movable roll.

DESCRIPTION OF THE ILLUSTRATED EMBODIMENT

Figure 1:
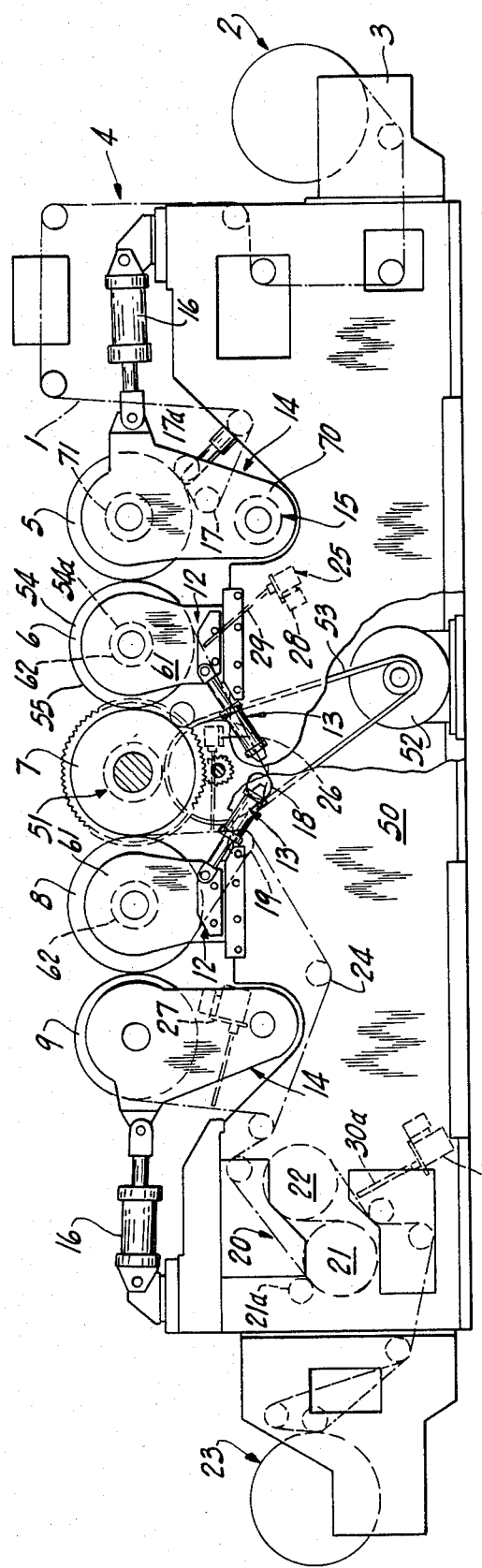
FIG. 1 is side elevational view of a five roll calendar apparatus for processing a roll of plasatic film for making a magnetic tape material.

Generally, the preferred embodiment of the invention is a five roll horizontal calendar unit which is adapted to calendar a web 1 drawn from a large roll 2 of a polyester film or web specially formulated for manufacture of computer magnetic foppy disks and the like. An unwind stand 3 includes a web feeding section 4 for feeding of the web 1 as it is withdrawn from the roll 3 into the five roll calendar unit.

The five roll calendar unit includes five aligned rolls 5, 6, 7, 8 and 9, with the end rolls 5 and 9 and the intermediate roll 7 being similar heated steel rolls. First and second intermediate rolls 6 and 8 are interposed one each between the center roll 7 and the two end rolls 5 and 9. The rolls 6 and 8 are fabric covered rolls having an outer layer of a suitable soft material such as paper, cotton or the like and generically referred to herein as a covered roll. The covered rolls 6 and 8 are not heated. The center roll 7 is mounted in a rotatably fixed support 11. The two paper rolls 6 and 8 are mounted in suitable slide roll guide unit 12 with the position of the rolls 6 and 8 controlled. In the illustrated embodiment of the invention, pneumatic or hydraulic piston/cylinder units 13 are coupled to the guide slide units 12 for selective positioning of the rolls 6 and 8. Each guide slide 12 unit and power cylinder unit 13 is a separate and independently controlled unit to permit individual control of the calendar rolls 6 and 8 to the opposite side of the fixed roll.

The end rolls 5 and 9 are also movably mounted in suitable pivot support units 14. Each unit 14 is secured to the corresponding rolls 5 and 9 and depends downwardly therefrom to a torque shaft assembly 15. A piston/cylinder unit 16 is coupled to the pivot support unit 14 generally in the horizontal plane of the rolls 5-9 and pivots the end rolls slightly, thereby positioning the corresponding heated rolls 5 and 9 toward and away from the fixed center roll 7. The pairs of steel and covered rolls 5 and 6, and 8 and 9, to the opposite side of the fixed roll 7 are provided with their own hydraulic loading system. This provides for independent control of the nip pressure and permits using of the apparatus as more fully described hereinafter as either a five roll calendar unit or a three roll calendar unit.

The web 1 is threaded through the five roll calendar apparatus for calendaring of the surface by successively moving thereof between the heated steel rolls and the opposite covered rolls. In the illustrated embodiment of the invention, the web moves from the right to the left. The web 1 is inserted into the calendar unit with the leading end located to engage the lower end of the first heated roll and wraps around the roll into the opposite nip between that heated steel roll 5 and the adjacent covered roll 6. The web 1 is fed onto the first heated steel roll 5 by an idler roll 17 and a preload roll 17a, which locates the web for appropriate interengagement with the heated roll. Idler roll 17 is preferably a Herringbone type roll which smooths out the web to eliminate any wrinkle. The several idler rolls hereinafter described are also of a Herringbone type to maintain the desired wrinkle free web. Roll 17a ias a flat, resilient roll such as a rubber roll. Roll 17a is loaded toward the end roll 5 and serves to force the web onto the roll and squeeze any air from the web surface moving onto the roll 5. Any air could create an insulating barrier interfering with proper web heating. The web 1 passes from the first nip about a grooved guide roll 18 which is located beneath the stationary center heated roll 7, and then back into the underside between the such roll 7 and the covered roll 6. The web 1 passes around the center heated roll 7 into the nip between the center heated steel roll 7 and the adjacent covered roll 8. A Herringbone guide roll 19 is mounted beneath the nip and guides the web from the roll 7. The web 1 passes around the guide roll 19 and then back up into the nip between the second covered roll 8 and the nip of the left end heated roll 9. The web finally passes about the upper side of the roll 9 downwardly into a chill unit 20 where it passes around first and second chill rolls 21 and 22 before being discharged into a rewind stand 23.

As previously noted, the apparatus can be used as a three roll calendar. In such application, the web 1 is discharged directly from the stationary heated roll 7. As shown, the web 1 is fed from an idler roll 19 to a further idler roll 24 and then into the cooling section 20.

In passing through the calendar unit, the surface is highly finished. The quality of the finish is related to maintaining not only of the proper pressure between the rolls 5-9, but the proper temperature of the web 1 as well as web tension as it passes between the rolls. In accordance with the illustrated embodiment of the invention, the rolls 5, 7 and 9 have a controlled heating means and non-contacting web temperature sensors 25, 26 and 27 for adjusting the temperature of the rolls.

Figure 2:
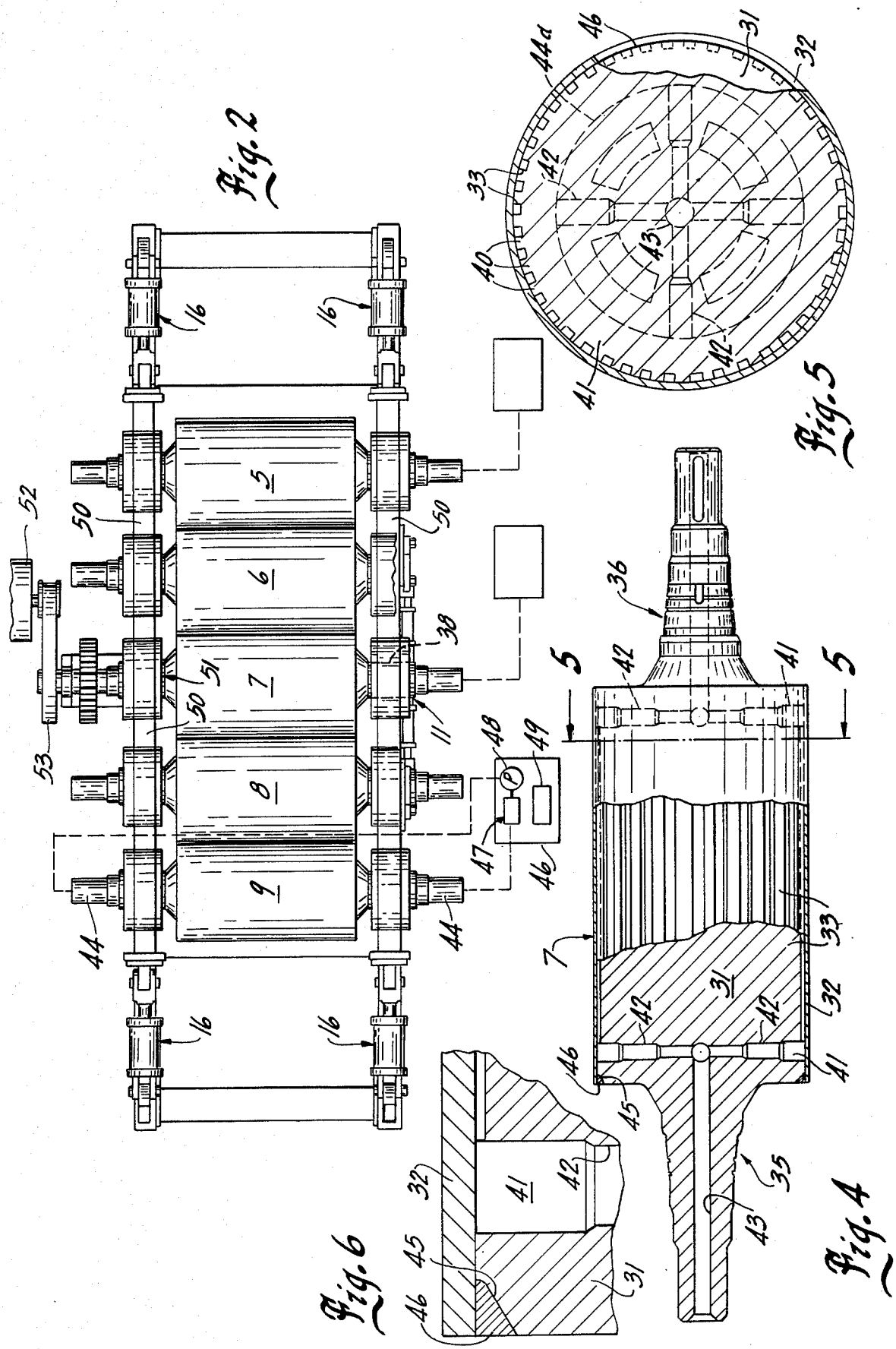
FIG. 2 is a plan view of the apparatus shown in FIG. 1.

Each of the three heated rolls 5, 7 and 9 is connected to a source of a heated liquid, as shown in FIG. 2 for controlling and varying the temperature of the roll. The three heat sensors 25-27, shown in FIG. 1, are located to monitor the extended portion of the web 1 as it moves from between the nip of the calendar heated roll and the covered roll, and particularly a short distance downstream from the engagement with the covered roll. Each sensor 25-27 is similarly constructed and includes a sensing head 28 directed toward the web and establishes a sensing beam 29 which engages the web in the area immediately downstream of the roll. The reflected signal is processed by the sensor and provides a signal proportional to the temperature of the portion of the web aligned in the sensor.

The first sensor 25 is mounted adjacent the first heated steel roll 5, in downwardly spaced relation thereto. This then provides a signal proportional to the web temperature as the web moves to the next processing stage, such as into the second nip defined between the fixed center roll 7 and the second covered roll 6.

The second temperature sensor 26 is located immediately beneath the fixed center roll 7 and monitors the web temperature as it leaves the discharge side of roll 7. Finally, the third temperature sensor 27 senses the temperature of the web 1 as it moves from the final roll 9 and just prior to entering the chill section 20. The chill section 20 includes a sensor 30—having a beam 30a provides a signal as the web moves from the chill rolls to signal and control cooling required for rewind.

Each of the heated steel rolls 5, 7 and 9 is specially constructed to establish a rapid change in the temperature of the heated roll in response to a demand signal from the sensor 25, 26 or 27, respectively, and thereby rapidly changing the heating of the web 1 so as to maintain the web more nearly at its optimum temperature. Referring particularly to FIGS. 4-6, the heated steel roll is shown having an inner solid core 31 and an outer thin shell 32. The core 31 is constructed with a plurality of longitudinal grooves 33 defining heat transfer passageways through the length of the roll immediately beneath the outer shell 32. The grooved roll is specially formed with a thin outer shell in intimate contact with the inner grooved core 31. A heated liquid 34 is passed at a high rate of flow through the passageways 33 and controls the surface temperature of the roll and thereby the web 1 passes over the roll.

In accordance with a preferred construction, the core 31 is formed with the plurality of longitudinal channels or grooves 33. The outer shell 32 is formed as a separate wall member formed of an internal diameter slightly less than the core. The shell 32 is expanded and then shrunk fit onto the core to establish an effectively integral coupling and interconnection of the shell to the core to form an essential unitary assembly.

The heated liquid flowing through the passageways heats the core 31 and the thin shell 32, resulting in an essentially rapid distribution of the heat to maintain the shell at an essentially uniform temperature. Further, with a high flow rate, the heated liquid passing through the passageway rapidly changes the actual surface temperature such that the web temperature is accurately and quickly controlled to maintain the corresponding control of the temperature of the web.

The heated and calendared web 1 is fed through the chill section 20 for cooling prior to rewinding. The cooling section as shown consists of the pair of chill rolls 20 and 21. The chill rolls are aligned with the incoming web 1 such that the web engages the one roll 21 generally parallel to the location of the line through the axis of the chill rolls 20–21. The web 1 passes around and between the chill rolls 20–21 and then back and around the second chill roll 21 exiting generally parallel to the entrance of the web. The chilled web 1 is fed downward through a pair of guide rolls into the rewind section 23 where it is rewound onto a core.

As previously noted, the present invention is particularly directed to the five roll calendar apparatus and the features incorporated therein. The unwind stand unit 2 can be a suitable spindle unwind with an over/under type construction. The unwind stand may be suitably mounted on bushings and oscillated for web guide control. The spindle is provided with a suitable mandrel preferably with pneumatic operator capable of handling various diameter cores and adjustable for running various web widths through the center of the apparatus.

The rewind apparatus may be a single spindle over-or-under rewind device. The rewind apparatus is, of course, adapted to receive suitable corresponding cores for receiving the calendared web 1. The unwind apparatus 23 is also any suitable device and is preferably provided with a suitable brake system such as a magnetic particle brake, a motor or other means for automatic tension control. The unwind frame may be suitably mounted on bushings and oscillated for web guide control.

Similarly, the chill unit 20 can be of any suitable and desired construction. For example, that illustrated double chill roll may use rolls of a wall and spiral passageway or baffle construction. The outer surface of the chills rolls are, of course, highly finished and preferably are chrome plated with a surface finish of microinches. The non-contacting sensor 30 monitors the temperature of the web and a suitable controller controls the flow rate for controlling the temperature of the chill rolls and thereby of the web 1 just prior to discharge to the rewind apparatus.

These and other features of the illustrated parts of the lines can and will be readily provided as a part of the calendaring apparatus by those skilled in the art and no further description thereof is given other than is necessary to a full and complete understanding of the present invention.

As previously noted the present invention is particularly directed to the structure of the calendaring apparatus and the preferred construction, is shown in the drawings and more fully described.

More particularly, the construction of the heated rolls and the monitoring of the temperature to control the temperature of the web is a highly significant feature of the disclosed invention.

The roll 5 includes is a solid steel core 31 formed of a suitable high strength steel.

Supporting shafts 35 and 36 are integrally made with the core 31 and project axially outwardly from the opposite ends thereof. The shafts are similarly specially shaped with bearing surfaces 37 and formed for mounting in rigid high precision roller bearings 38 to rotatably support the rolls. The bearing is preferably a double roll tapered bore spherical construction such as that manufactured and sold by SKF, and is selected to essentially eliminate roll runout. The support and the structural orientation characteristic of each of the steel rolls is such that a maximum deflection of 0.0001 inches at 3000 pli may occur under operating conditions. The diameter of the solid core 31 is slightly less than the final diameter of the steel roll 5 and the outer peripheral surface of the core is highly finished. The plurality of corresponding longitudinal grooves 33 are machined into the peripheral surface of the core. Each groove is similarly formed and extends throughout a substantial length of the core, terminating in slightly spaced relation to the outermost end of the core. Each groove 33 is shown, most clearly in FIGS. 5 and 7, having a substantially rectangular cross section. Further, the grooves 33 are separated from each other by lands 40. It is important to build a groove structure having a substantial physical surface support between the grooves to support the shell 32. The thickness of the shell, the size of the cavity and the separating lands is of substantial if not critical significance in producing an optimum web surface treatment. Thus, the temperature across the nip, which has a certain length in the direction of web travel, should be constant. Thus, the dynamics of the transfer of the heat from the heated liquid into the shell over the face of the cavity and the lands requires that the several dimensions of the cavities, lands and shell be interrelated to produce the proper conduction of heat to the outer surface of the shell. However, the further factor which is critical is the forming of the shell to maintain the smooth, constant outer diameter. Thus, the shell spanning the groove or cavity 33 essentially must not deflect into the cavity because such deflection would be imprinted onto the web 1 and result in a detachable corrugated surface. For example, in the calendaring apparatus for calendaring a magnetic tape for use in manufacturing of magnetic disks, a maximum deflection of 5 millionths (0.000005) of an inch may be specified. Such a minute specification requires special consideration of the several factors discussed above. The inventors have found that the dimensional relationship can be determined by appropriate thermal dynamic analysis and if necessary simple empirical construction to obtain the desired degree of response and strength in the finished roll. Thus, a typical structure may have a shell thickness between 0.375 to 0.600 inches with a land width of ⅛ inch and a cavity width of 3/16 inch and a depth of 3/32 inch. With the shell thickness at the lower end of the range, a greater response is obtained. With the shell thickness at the upper end of the range, a lesser response results but a somewhat more uniform distribution and a lesser shell deflection is created. Similarly, varying of the land and cavity size will affect the respective characteristics. Thus, as noted, the dimensional relationship is of substantial importance but the several factors require a certain compromise to produce the desired physical characteristics and the desired thermal characteristic for any given specified application.

The opposite end of grooves 33 are coupled to similar annular circumferential grooves 41 extending about the complete circumference of the roll 5. Four radial openings 42 are equi-circumferentially spaced about the core and extend from the common groove 41 to the center of the core 31. An axial passageway 43 extends from the common intersection of the openings 42 outwarding and terminate in a rotary connector 44 for connection into the circulating liquid system with the source and heater. The radial passageways 42 and the groove 41 are specially constructed on a stepped passageway a shown and arranged to equalize the pressure throughout the passageways 33. The annular groove 41 is substantially deeper than the passageways 33. A baffle plate, not shown, may be mounted within the groove 41.

As shown in FIG. 5, the four equicircumferentially extended passageways 42 define four segments within the end of the core which can be machined for dynamic balancing. Generally, the dynamic unbalance can be corrected by machining along a circumferential strip 44a extending around the core 31 between the passageways 42. The tolerances required in the maintaining of the location of the roll surface is highly critical and requires not only a highly finished surface in construction of the roll but proper mounting and the maintaining of the position of the roll.

The grooves 33 are closed by the outer shell 32. The seamless shell is a relatively thin metal shell formed of a high strength steel. In forming the roll, the internal diameter of the shell 32 before assembly is slightly less than the external diameter of the machined finished core 31. For example, in a 19 inch diameter roll having a width of 35 inches, the internal diameter of the shell was 17.778 inches and the external diameter of the core 31 was 17,816 inches. The shell 32 is assembled to the core by heating of the shell such that it expands and can be telescoped onto the core 31. Upon cooling, the shell 32 shrinks to form a high degree of an interference fit and with the shell under tension which creates a high pressure fluid tight sealing of the cavities or grooves 33.

The shell 32 is formed with an axial length slightly greater than that of the core 31. In the assembled relation, it overlaps the opposite ends of the core. The outer peripheral edge of the core 31 is also provided with a chamfer edge 45 defining a generally V-shaped groove between the end of the core and the adjacent shell. The shell 32 is welded to the core 31 by deposit of the weldment 46 material within the groove to firmly and rigidly attach the shell to the core.

The center roll is fixed in the supporting framework. Each end bearing frame is a heavy rigid metal structure. The bearing is rigidly mounted within the frame to rotatably support the roll. The bearing is a high precision tapered roller bearing to establish and maintain precise location of the roll. The center roll is power driven. An electric motor of a suitable horsepower is mounted adjacent the one end of the roller. A belt drive coupling with a gear set connects the output shaft of the motor to the roll shaft, establishing a positive drive of the roll. The center roll is the only driven roll. It provides a friction surface drive to the other four rolls. Alternately, the three heated rolls 5, 7 and 9 may all be positively drive, if for any reason the friction device provided by the web is not acceptable. Further, during web-up, the rolls are not driven, as shown.

It is significant and important to attach the shell to the core 31 so as to provide an integrated structure essentially corresponding to a single integral member. The shell is heated, transported onto the core and cooled to establish a shrink fit with a high interference fit onto the core. The shrink fit provides an intimate coupling to the core 31 and an appropriate covering over the grooves 33 such that the hot liquid can be pumped therethrough under a high pressure.

The heat shrink of the shell 32 onto the core 31 results in not only an interference fit but a tensioned stressing of the shell over the grooved surface. This results in a proper closure of the grooves. The grooved roll can readily withstand the necessary pressures and temperature of the pumped hot liquid passed through the core passageway for heating or cooling the roll.

Thus, in a practical application the heating liquid is raised to a temperature of approximately 200° F. but may be substantially higher. The hot liquid is transmitted through the system at a flow rate of 50 gpm and pressure of about ten pounds per square inch. The relatively thin and tensioned shell serves to fully support such pressures while establishing a very rapid interchange of the temperature of the liquid in the grooves to the shell and thus to the web as it passes over the shell. The heat transfer liquid may be any suitable high temperature liquid. The inventors have found a 50% mixture of ethylene glycol and water provides a particularly satisfactory liquid.

Each roll 5, 7 and 9 is provided with its own independent controlled heating system 46 for contrlling the temperature of the liquid supplied to the corresponding roll. Although any suitable system can be provided, the illustrated system includes a suitable high temperature heater/chiller unit 47 operable to rapidly and effectively change the temperature of the liquid. The temperature of the liquid is held to within one degree of the demand temperature. A high temperature circulating pump 48 is coupled to the heater/chiller unit 47 and is operable to transfer the heated liquid under effective pressure to the rotary coupler and passageway of the heated roll. A controller 49 is provided for controlling the operation of the heater/chiller unit 47 and thereby the temperature of the liquid circulated to and through the roll. The controller 49 may be of any suitable construction such as a Honeywell Dialtrol unit in combination with a proportional control of the heater/chiller unit. The heater/chiller unit 47 may be a conventional unit such as that available from Capitol Temptrol Corporation and which includes a separate heater for increasing the temperature of the liquid and a chiller having a heat exchanger to receive the hot liquid, with a modulating valve to control circulation of a collant through the exchanger. The proportional control may be a suitable SCR proportional drive such as manufactured by Athena Control Inc. The signal from the Dialtrol unit is processed to produce a ramp proportional SCR drive such that the correction is proportional to the magnitude of the detected error in temperature. The output of the drive is coupled to either the heater or the modulating valve to correspondingly vary the temperature of the liquid. The controller preferably includes suitable safety interlocks for assuring proper operation of the calendaring apparatus.

In operation, the first heated roll 5 is operated at an elevated temperature to rapidly bring the temperature of the web from ambient up to the working temperature. In contrast, heated rolls 7 and 9 generally serve to reduce the temperature of the web to compensate for the increase in temperature as a result of the web passing through the nip of the rolls.

Center heated roll 7 is rotatably fixed in the support framework 50 which includes a heavy rigid metal bearing frame. A special bearing 51 is rigidly mounted within the frame to rotatably support the roll. The bearing as noted previously, is a high precision tapered roller bearing to establish and maintain precise location of the roll. The frame structure preferably includes a split bearing mount for removal of the rolls. An electric motor 52 of a suitable horsepower, is mounted adjacent the one end of the center roll. A belt drive and gear set 53 couples the output shaft of the motor to the roll shaft and establishes a positive drive of the center roll 7. In the illustrated embodiment, the rolls 5, 6 and rolls 8, 9 are pressure loaded toward the center roll 7 which creates a friction surface drive to the other four rolls 5, 6, 8 and 9.

Each paper covered roll 6 and 8 is similarly constructed with a solid inner steel core 54 having suitable end supporting shafts 54 rotatably mounted in the frame structure. The rolls 6–8 are covered with a suitable calendaring paper or other material 55 which in cooperation with the opposed heated roll works the web 1 and particularly the surface thereof to produce the necessary extremely high finely finished calendared surface. The material used in the covered roll is that conventionally used in calendaring apparatus, is well known and is readily available to those skilled in the art. Consequently no further description of the calendar roll, as such, is necessary or given herein.

Figure 3:
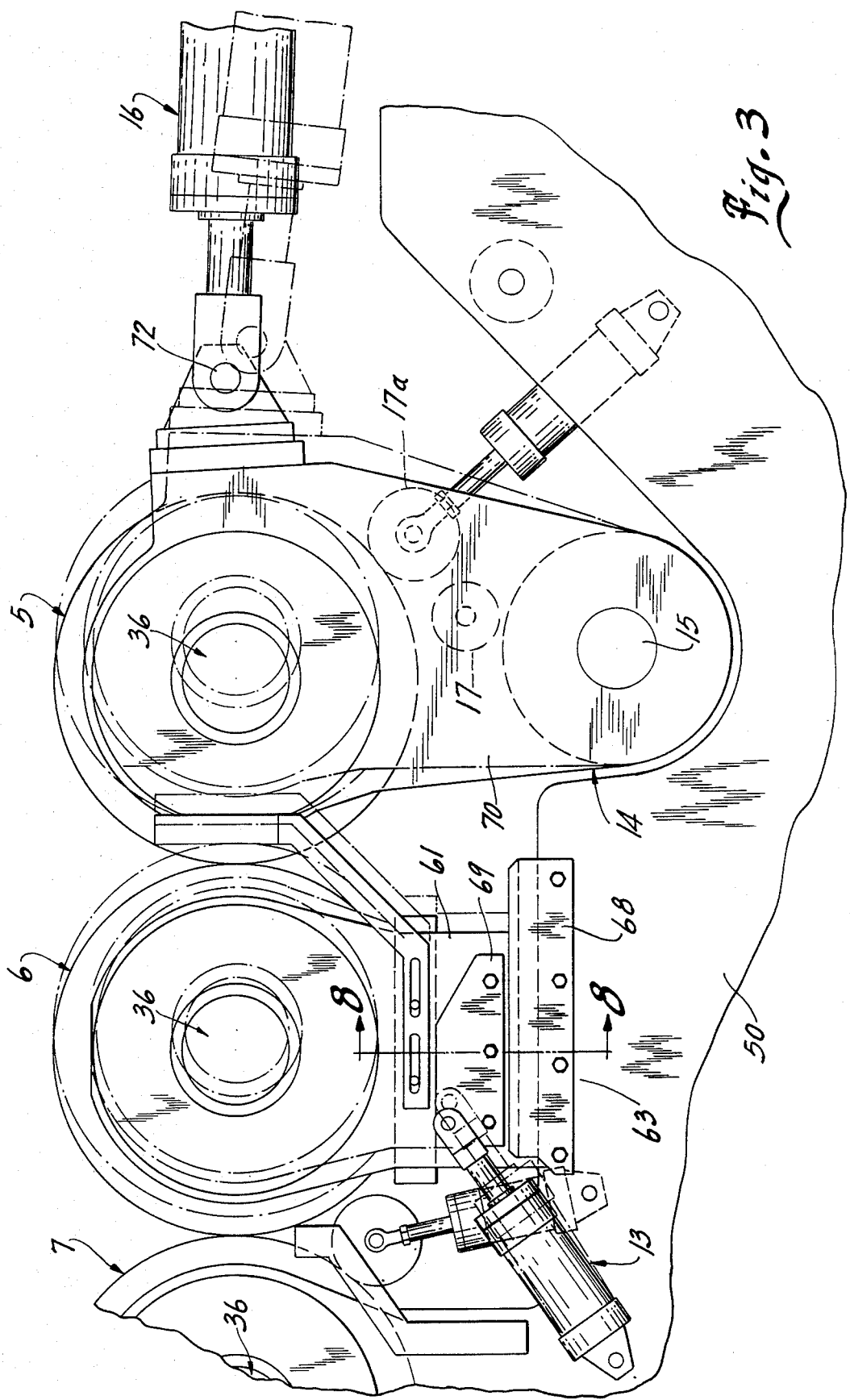
FIG. 3 is an enlarged fragmentary side elevational view of the apparatus.

The opposite ends of each paper roll 6 and 8 is similarly mounted in a suitable slide guide unit 12, as most clearly shown in FIGS. 3 and 8. Referring particularly to FIGS. 3 and 8, the slide guide unit 12 in the illustrated embodiment of the invention is a heavy supporting slide structure which permits accurate movement of the covered roll longitudinally of the calendaring apparatus while maintaining a highly rigid and effective support of the such roll. In particular, the slide guide includes a roll frame 61 within which the precision tapered bearing unit 62 is secured. The lower end of the frame 61 rests on a frame member 63. Frame 61 is a heavy plate-like member having the inner and outer faces provided with aligned grooves 64 and 65. The groove 65 on the inner face defines an inner projection 66 which mates with a grooved plate 67 secured to frame 63. An L-shaped clamp member 68 is bolted to the frame 63 and extends over the outer surface of the frame and into the outer groove 64. The groove surface and projections have machined surfaces to permit sliding of the bearing units on the frame. Bolting of the clamp bracket 68 in place clamps the bearing plate or frame 61 in engagement with the race or track to define a highly finished slide guide for the corresponding end of the covered roll 6. The pneumatic piston/cylinder unit 13 is secured to the frame 63 and coupled to a slide coupling plate 69 which is bolted to frame 61 for movement and positioning of the covered roll 6 longitudinally of the calendaring apparatus. The cylinder 13 is pivotally mounted to the frame below and to one side of the slide with a piston shaft extending outwardly from the cylinder at an angle to the slide plate where it is pivotally interconnected thereto, as shown in FIG. 1.

Identically, the slide units 60 are provided at each end of the covered roll and are interconnected by a cross brace 69a. Although corresponding pneumatic cylinder units 13 are applied to eachslide unit, the cross 69a insures parallel tracking and movement of the opposite ends of the covered roll. This insures the accurate positioning of the roll 6 relative to the fixed roll 7 and the opposed end roll 5. Thus, operation of the power unit results in a corresponding positioning of the slide and paper roll 6.

Each covered roll 6 and 8 is independently and separately positioned into selected pressure engagement with the fixed center roll 7 and is effectively held in appropriate relationship to the center roll by the power cylinder units.

The covered roll is also fixed relative to the end heated roll. A pressure engagement of the heated end roll 5 with the covered roll 6 is also provided.

The end heated rolls 5 and 9 are similarly mounted. Referring particularly to the right hand steel roll 5, as viewed in FIGS. 1 and 3, the roll 5 is constructed essentially as the center roll. The pivot frame 70 is a high strength and rigid construction to support each end of the roll 5. Tapered precision bearings 71 again rotatably support the roll 5. With the frame 70 appropriately fixed relative to the center roll, the end heated roll has its axis essentially in the plane of the center roll 7. The supporting torque shaft 15 is rigidly mounted in the frame 50 beneath the steel roll 5, with the axis of the torque shaft longitudinally offset slightly from the heated steel roll 5. The torque shaft 15 is mounted in suitbale bearings and is affixed to the frame by suitable pins 71. The lower end of the torque frame 70 is rigidly fixed to the corresponding adjacent end of the torque shaft 15. Thus, any relative movement of the frames 70 at the opposite ends of roll 5 results in twisting of the torque shaft 15 and a corresponding torsion spring force is created to hold the roll square, that is, with the axis of rolls 5 and 7 parallel. A separate power cylinder unit 16 is similarly coupled to each of the end torque frames 70 and each power unit 16 is a suitable high force hydraulic unit. As shown in FIGS. 1 and 2, in the illustrated embodiment, the cylinder is fixedly mounted to the frame 50 generally in alignment with the torque frame 70. A piston rod projects outwardly from the cylinder and is pivotally coupled as at 72 to the end frame 70. The cylinder unit 16 thus operates to position the heated roll 5 inwardly into engagement with the covered roll 6 which in turn is forced into engagement as previously described with the fixed heated roll 7. The location of the torque shaft with respect to the steel roll and its interengagement to the covered roll is such that the engagement between the rolls is maintained with a common plane through the axii of all five calendar rolls 5–9 and with the axii of all five rolls parallel.

The combination of the slide mounting for the covered roll 6 and the pivot mounting of the heated steel rool 5 has been found to provide a highly effective and accurate positioning of the rolls under the high pressures, high temperature and rapid speed conditions necessary for optimum surface treating and particularly calendaring the surface of the polyester film. The pivot mounting of the end roll 5 on the torque shaft 15 creates a controlling force on the end roll frames 70 and the interconnected hydraulic units to hold the end rolls and therefore the operating system square. As a result, the covered roll 6 is held square with relationship to the fixed center roll 7 and the end roll 5 and creates a long operating life for the covered roll 6. The slide unit 12 used on the covered roll may be a pivot structure also. The slide unit is not as costly, however, and provides a satisfactory operation. Thus, the slight pivotal movement occasioned other than during initial web insertion is sufficiently minor as to maintain, for practical purposes, the axii of all rolls in a common horizontal plane, and the definition herein of the rolls in a common horizontal plane includes such variance.

The temperature of the web as it passes between the rolls is of course a highly significant factor. Much effort has been expended and applied to developing systems for controlling and maintaining the proper temperature of the web at each of the processing or calendaring points.

In the present invention, the temperature of web 1 as it leaves each heated steel roll 5, 7 and 9 is monitored. In the illustrated embodiment of the invention, the three heat sensing units 25, 26 and 27 are mounted to the frame structure in longitudinally spaced relation and located to monitor the temperature of the web as it leaves the heated course of the heated roll. Each of the sensing units may be of an identical construction and is preferably a non-contacting heat sensor. A particularly satisfactory heating unit is manufactured and sold under the trademark Raytek which is an infrared sensor which transmits an infrared beam and the unit responds to the reflected energy from the web. The sensor includes a housing which is fixed to the frame 50 with the infrared energy beam 29 directed to engage the web 1 as it leaves a heated steel roll. The beam 29 is located to engage the web essentially perpendicular thereto and slightly downstream from the exiting surface engagement with the roll. The temperature of the web 1 is related to the temperature of the heated roll, to the nip pressure and the rotational speed of the calendaring apparatus. In the absence of some control in the heating of the roll and therfore the web, the temperature of the web may vary in a not insignificant manner as the web moves through the apparatus. Any change in temperature in the web is, however, instantaneously reflected in the temperature sensor which transmits the proportional signal to the controller. The controller in turn compares and monitors such signal to provide any necessary corrective action. Thus, if the temperature of the web 1 varies from the desired value, the temperature of the hot liquid is rapidly changed. In addition the flow rate of the liquid through the heated roll can be adjusted to either increase or decrease the temperature of the heated steel roll and thereby modify and appropriately change the temperature of the web at the heat sensor. The same signal can be used to further modify the temperature of the downstream heated roll. Generally, the temperature of the web as it enters into engagement with the downstream heated roll should be at a predetermined fixed temperature. If the variation of the web from that desired temperature is known, the temperature of the downstream roll can be modified to compensate for the variation at the input of the treating rolls.

Thus, the combination of the appropriate sensing of the web temperature and the rapidly responding heated rolls provides for optimization of the temperature of the web during the calendaring processing.

The calendered web is passed through the chill unit to rapidly reduce the temperature of the web prior to rewinding. In the illustrated embodiment of the invention, a pair of chill rolls are illustrated with the web passed around and between the chill rolls. Each of the chills rolls is similarly constructed with a suitable means for controlling the flow therethrough. The non-contact temperature sensor 30 forms a part of the chill unit. It is aligned with and senses the temperature of the web as it is discharged from the second chill roll 22 and just prior to entering the rewind stand 23. It provides a signal controlling the circulation of the fluid to the chill roll units to maintain the temperature of the web at a desired reduced temperature. The temperature of the web just prior to rewind is not as critical as that of the temperature of the web during the calendaring apparatus. Consequently, the chill roll units may be of any suitable or desired construction and no further description thereof is given.

The rewind apparatus simply may be of any suitable construction adapted to maintain a constant tension on the web and rewinding thereof onto a suitable core. For example, such rewind apparatus is readily commercially available and currently used in processing of film and paper and consequently no further description or illustration of a rewind apparatus is given herein.

The apparatus as shown has been constructed to process a polyester film for magnetic tape. The film has a thickness of 1 to 8 mils. The apparatus is capable of operation at a linear speed of up to 750 feet per minute for a film thickness up to 3 mils, and is operated at reduced speed from 3 to 8 mils. The web temperature was controlled at each point in the cycle and at any given sensed position a temperature of ±2 degrees Fahrenheit (±2° F.) is maintained. In moving about the first roll 5, the temperature was elevated from ambient to calendaring temperature; for example, a temperature of 250° F. as the web leaves the first nip. At 750 feet a minute and 3000 pli and the preselected temperature of 250° F., the nip horsepower adds 17° F. to the web temperature. The web enters the second nip between the covered roll and the fixed roll at 250° F. and exits at an unknown temperature. In moving about the fixed roll 7, the web temperature is adjusted such that when it leaves the third nip it is at a temperature of 250° F. The web thus entered the fourth nip at 250° F. and again adjusts as it moves about the end heated roll to exite from the five calendar roll at 250° F., at which temperature it was introduced into the chill section, and cooled to 80° F.

Various modes of carrying out the invention are contemplated as being within the scope of the following claims and particularly pointing out and distinctly claiming the subject matter which is regarded as the invention.

We claim:

1. In a web treating apparatus for heat treating of the surface of a web drawn from a roll stock, comprising at least three surface treating rolls including a covered roll located between first and second heated rolls, said heated rolls including a rigid round base having end bearing supports for rotatably supporting the roll, said rigid base having a finished outer surface, a plurality of passageways extending axially through the base and located immediately inwardly of the outer surface, means for transferring a temperature controlled liquid through said passageways at an essentially controllable constant temperature for transfer of thermal energy through said outer wall, means for urging said rolls into engagement at a selected working pressure, said passageways and said outer wall and the portions of the roll located between said passageways being arranged and constructed to establish an outer wall strength sufficient to support said working load essentially without deflection of said outer wall into said passageways and simultaneously establishing transfer of thermal energy through said outer wall to maintain an operative constant temperature over the face of the heated roll with the temperature of the outer wall which is aligned with the passageways being essentially identical to the temperature of the outer wall which is aligned with the portions of the roll separating said passageways.

2. The apparatus of claim 1 wherein said support means rotatably mount said rolls with the axis of the several rolls in an essentially common horizontal plane.

3. The apparatus of claim 1 including means whereby said web passes over at least 100 degrees of the first roll.

4. The apparatus of claim 1 including individual sensing means for sensing the temperature of the web leaving each of the heated rolls, and a closed loop heat transfer system for each of said heated rolls connected to the corresponding sensing means operable to control the temperature of the corresponding heated roll.

5. The apparatus of claim 1 including an entrance guide roll located adjacent the one heated roll, means biasing the guide roll to engage said heated roll and operable to squeeze air from the surface of the web as the web moves onto the roll.

6. A heated roll unit for a web heating unit wherein a web is moved over the roll under pressure, comprising a rigid round base having end bearing supports for rotatably supporting the roll, a plurality of passageways extending axially through the base and located immediately inwardly of the outer surface, means for supplying a temperature controlled liquid through said passageways at an essentially controllable temperature for transfer of thermal energy through said outer wall, said passageways and said outer wall and the roll base located between said passageways being arranged and constructed to establish an outer wall strength sufficient to support said working load without detectable deflection of said outer wall into said passageways and simultaneously establishing transfer of thermal energy through said outer wall to maintain an operative constant temperature over the face of the roll with the temperature in the wall aligned with the passageways essentially identical to the temperature of teh outer wall in alignment with the wall separating said passageways.

7. A web treating roll apparatus for processing a film-like web, comprising a rigid core having opposite end shafts, the peripheral surface of said core being finished and having a plurality of longitudinal grooves and being separated by solid lands, an outer shell affixed to said core, said shell operating under tension to seal said grooves and define a plurality of parallel passageways, and means coupled to the ends of said grooves to supply a heat transfer liquid thereto.

8. The roll apparatus of claim 7 wherein said shell is affixed to said core with a shrink fit.

9. The roll apparatus of claim 7 having an annular encircling grooves in the opposite ends of said core connecting said longitudinal grooves, said encircling grooves being substantially larger than said longitudinal grooves to equalize the pressure in said longitudinal grooves.

10. The calendaring roll of claim 7 wherein solid lands being an integral part of said core, and said outer shell being affixed to said core with an interference fit.

11. The calendaring roll of claim 7 wherein said solid core is formed of a high strength steel having opposite integral end shafts, spherical bearing means supporting said shafts for rotatably supporting said core with a maximum deflection of 0.0001 inches between the bearing means.

12. Surface treating apparatus for working the surface of a web, comprising a covered roll, first and second heated rolls located to the opposite sides of said covered roll, means mounting said rolls with the axii of the rolls in a common horizontal plane, pressure loading means coupled to said rolls and urging siad rolls to establish pressure engagement between the covered roll and each of said heated rolls, means coupled to said rolls to maintain the axis of said heated rolls parallel and thereby maintaining corresponding parallel engagement of the surface of said covered roll, wherein said one heated roll is rotatably mounted in a stationary support, said covered roll being mounted for movement relative to said first heated roll, and said second of said heated rolls being mounted for relative movement into and from engagement with said covered roll, and loading means coupled to said second heating roll and operable to force said second heated roll toward said covered roll under a selected force level, and loading means coupled to said covered roll and said second heated roll for maintaining said axii in parallel orientation to said first heated roll, said loading means including first and second loading member units coupled one to each end of said covered roll and said second heated member.

13. A web surface treating apparatus for calendaring the surface of a web for forming of magnetic floppy disks and the like, comprising a heated roll having a bearing support means for rotatably mounting thereof, a power drive means coupled to one end of said heated roll and operable to rotate said heated roll, said roll being supported with an essentially horizontal axis of rotation, a covered soft roll located to one side of said heated roll with the axis of said rolls substantially in a common horizontal plane, a movable support means as a part of said apparatus for movement of the soft roll in a horizontal direction with said axis moving essentially in said horizontal plane, a second heated roll located to the opposite side of said covered roll with an axis of rotation substantially in said horizontal plane, a movable support means as a part of said apparatus for movement of said second heated roll in said horizontal plane, means coupled to said first and second movable support means for separately moving said movable support means, and means coupled to the second heated roll operable to positively maintain the axis of said second heated roll and said soft covered roll parallel with each other and with said first heated roll.

14. The apparatus of claim 13 wherein said movable support means for said covered roll includes a linear slide unit, and said support means for said second heated roll includes a pivot frame means having bearing means for supporting the second heated roll, said means to maintain said roll axis parallel a torque shaft located in substantial alignment with the corresponding heated roll and rigidly affixed to the pivot frame means whereby pivoting of the end frame means twists said torque shaft and creates a torsion spring force on the heated roll to maintain all rolls aligned.

15. The apparatus of claim 13 wherein each of said heated rolls is correspondingly constructed and includes said heated rolls including a rigid round base having end bearing supports for rotatably supported the roll, said rigid base having a finished outer surface, a plurality of passageways extending axially through the base and located immediately inwardly of the outer surface, means for transferring a temperature controlled liquid through said passageways at an essentially controllable constant temperature for transfer of thermal energy through said outer wall, means for urging said rolls into engagement at a selected working pressure, said passageways and said outer wall and the portions of the roll located between said passageways being arranged and constructed to establish an outer wall strength sufficient to support said working load without deflection of said outer wall into said passageways and simultaneously establishing transfer of thermal energy through said outer wall to maintain an operative constant temperature over the face of the heated roll with the temperature of the outer wall which is aligned with the passageways being essentially identical to the temperature of the outer wall which is aligned with the portions of the roll separating said passageways.

16. The apparatus of claim 13 wherein each of said heated rolls is correspondingly constructed and includes a core having a finished peripheral surface, a substantial plurality of longitudinal grooves circumferentially spaced about said periphery of the core, the adjacent grooves being separated by integral lands, an outer thin metal shell affixed to the core by a high pressure interference fit whereby said shell is placed under tension and closes said grooves to define high pressure heating passageways.

17. The apparatus of claim 13 including separate supply means for supplying heated liquid to each of said heated rolls, a separate heat sensor secured to sense the temperature of the web as it moves from each of said heated rolls and connected to the corresponding supply means for at least one of said rolls.

18. The apparatus of claim 16 wherein each end of said core having an annular groove interconnecting each said axial grooves, a radial passageways in said core extending from the center of the core to the annular groove, an axial passageway in each end of said core extending from the radial passageways to the exterior of the supporting shaft, said groove and supply passageways being constructed to equalize the pressure at each of said grooves and rotary couplings secured to the ends of the shaft and providing for connection of the axial passageway to said supply means.

19. A calendaring apparatus for calendaring the surface of a polyester film web for forming of magnetic floppy disks and the like, comprising a central heated roll, a fixed bearing support means including bearing means coupled to the opposite ends of said central heated roll for rotatably supporting thereof, said roll being supported with an essentially horizontal axis of rotation, first and second covered soft rolls located one each to the opposite side of said center heated roll with the axis of each roll substantially in a common horizontal plane with said center roll, bearing support units for each of said covered rolls, each of said support units including a movable support means for movement of the bearing units and the soft roll in a horizontal direction, first and second end heated rolls located one each in an opposed working engagement with each of said covered rolls and located with an axis of rotation substantially in said common plane with the axis of the fixed heated roll and the covered soft rolls, movable support means for each end of said heated rolls, a power unit for each of said support means for said heated rolls, each of said heated rolls being correspondingly constructed and including a rigid inner core having end support shafts projecting axially outwardly thereof into said support means, said core having a finished peripheral surface, a substantial plurality of longitudinal grooves circumferentially spaced about said periphery of the core, the adjacent grooves being separated by integral lands, an outer thin metal shell affixed to the core, said groove and adjacent lands and the thickness of said shell being constructed to prevent deflection of the shell into the groove and to transfer heat to the outer surface of the shell to maintain a constant working temperature at the outer surface of the shell, each end of said core having an annular groove interconnecting each said axial grooves, radial passageways in said core extending from the center of the core to the annular groove, said groove and radial passageways constructed to equalize the pressure at the adjacent end of said grooves, an axial passageway in each end of said core extending from the radial passageways to the exterior of the supporting shaft, rotary couplings secured to the ends of the shaft and providing for connection of the axial passageway, and separate heated liquid supply means for supplying hot liquid to each of said heated rolls, a separate heat sensor secured to sense the temperature of the web moving from each of said heated rolls and connected to the supply means for at least one of said rolls.

20. The apparatus of claim 19 having a power drive means coupled to one end of said heated roll and operable to rotate said heated roll, power units secured one each to each of said movable support means for selective loading of the covered rolls with respect to said center heated roll.

21. The apparatus of claim 20 wherein said movable support means for said cover rolls each includes a slide support unit, said power unit being connected to said slide support unit.

22. The apparatus of claim 19 wherein said thin metal shell is secured to said core by a high pressure interference fit whereby said shell is placed under tension and closes said grooves to define high pressure heating passageways.

23. The apparatus of claim 19 wherein said movable support means for said heated roll includes a pivot frame having a bearing unit for supporting the corresponding end of the heated roll, first and second torque shafts located one each in substantial alignment with the corresponding heated end roll, means rigidly affixing the opposite ends of the torque shaft to the pivot frames of the corresponding end roll whereby related pivoting of the end frames twists said torque shaft and creates a torsion spring force on the end frame member, said power units connected one each to each of said end frames for selective loading of said end rolls into pressure engagement with the covered rolls.

* * * * *

UNITED STATES PATENT AND TRADEMARK OFFICE
CERTIFICATE OF CORRECTION

PATENT NO. : 4,519,757
DATED : May 28, 1985
INVENTOR(S) : EUGENE W. WITTKOPF ET AL

It is certified that error appears in the above-identified patent and that said Letters Patent is hereby corrected as shown below:

Col 1., line 29, after "from" cancel "a"; Col. 2, line 3, cancel "aplicable" and substitute therefor ---applicable---; Col. 4, line 51, cancel "plasatic" and substitute therefor ---plastic---; Col. 5, line 8, cancel "foppy" and substitute therefor ---floppy ---; Col. 5, line 64, cancel "ias" and substitute therefor ---is---; Col. 8, line 15, after "includes" cancel "is"; Col. 9, line 24, after "passageway" cancel "a" and substitute therefor ---as---; Col. 9, line 49, cancel "17,816" and substitute therefo ---17.816---; Col. 10, line 9, cancel "drive" and substitute therefor ---driven---; Col. 10, line 42, cancel "contrilling" and substitute therefor ---controlling---; Col. 10, line 64, cancel "collant" and substitute therefor ---coolant---; Col. 12, line 11, cancel "correspnding" and substitute therefor ---corresponding---; Col. 12, line 39, cancel "suitbale" and substitute therefor ---suitable---;

UNITED STATES PATENT AND TRADEMARK OFFICE
CERTIFICATE OF CORRECTION

PATENT NO. : 4,519,757

DATED : May 28, 1985

INVENTOR(S) : EUGENE W. WITTKOPF ET AL

It is certified that error appears in the above-identified patent and that said Letters Patent is hereby corrected as shown below:

Col. 13, line 47, cancel "therfore" and substitute therefor---therefore---; Col. 14, line 51, cancel "exite" and substitute therefor ---exit---; Col. 15, line 53 (Claim 6) cancel "teh" and substitute therefor---the---; Col. 16, line 18, (Claim 12) cancel "siad" and substitute therefor ---said---; Col. 16, line 29, (Claim 12) cancel "heating" and substitute therefor ---heated---

Signed and Sealed this

Third Day of June 1986

[SEAL]

Attest:

DONALD J. QUIGG

Attesting Officer

Commissioner of Patents and Trademarks